Sept. 15, 1931.   J. K. SHELLEDY   1,823,668
TIMING DEVICE
Filed May 1, 1930

Inventor
James K. Shelledy
By Zabel & Banning Attys.

Patented Sept. 15, 1931

1,823,668

UNITED STATES PATENT OFFICE

JAMES K. SHELLEDY, OF HARVEY, ILLINOIS

TIMING DEVICE

Application filed May 1, 1930. Serial No. 449,073.

My invention relates to timing devices by means of which it is possible to have a device operate say for one certain period of time and then remain inoperative for another period of time either of which may be varied.

It is the principal purpose of this invention to provide a device of this character which while controlling by means of electrical circuits is wholly independent of any variations in electrical current supply in so far as the timing features thereof are concerned.

It is also a purpose of this invention to provide a timing device of this character which may be used in connection with another controlling device such for instance as a thermostat and which is capable of receding itself automatically so as to run the periods of timing from the last time of control by said other controlling device.

I will describe one form which my invention may take by reference to the accompanying drawings wherein—

Figure 1:
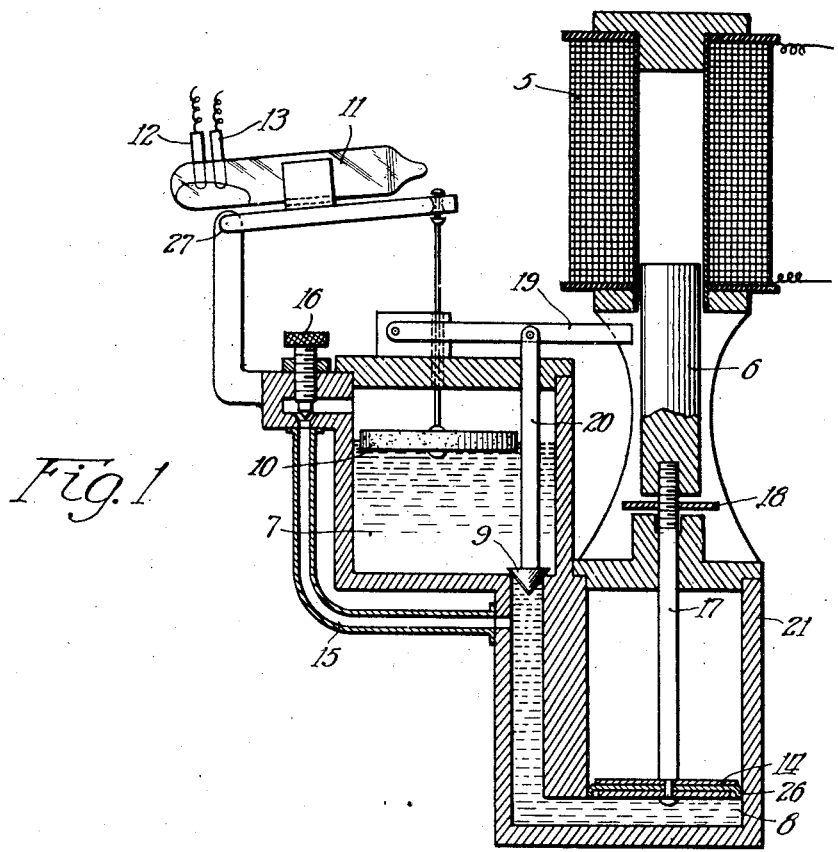
Figure 2:
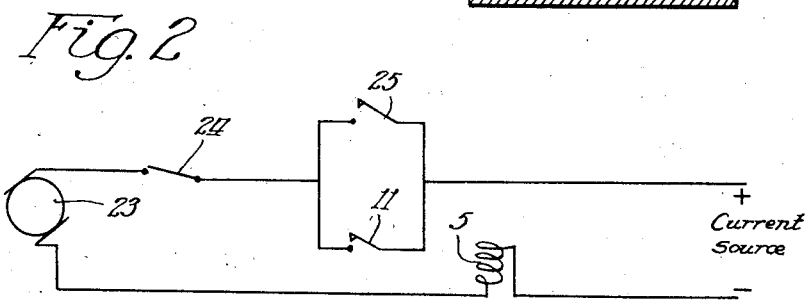

Fig. 1 is a cross section through the operating mechanism of the timing device; and Fig. 2 is a wiring diagram showing the manner in which this device may be applied to the control of motor operative equipment.

Referring now in detail to the drawings, the invention consists essentially of a coil 5 adapted to be suitably energized so as to raise the solenoid plungers 6 and thereby control the passage of fluid from chamber 7 to chamber 8 by actuating a valve 9. Cooperating with the fluid in the chambers 7 and 8 is a float 10 which in turn controls the operation of the mercury switch 11 which opens or closes the operating circuit at the contacts 12 and 13 of the device the timing of which is to be accomplished. The plunger 6 due to its weight also cooperates with the piston 14, conduit 15, and control element 16 to control one of the periods of time—namely the off period—for the device which is set in operation by closing the contacts 12 and 13.

The piston 14 has adjustably mounted on the rod 17 thereof an actuating element 18 which may be raised or lowered by merely turning the same on the screw threads of the rod 17 which element is adapted to engage the free end of the lever 19 to thus lift by means of rod 20 the valve 9 whenever the solenoid plunger 6 is elevated. The amount of opening of the valve 9 may, of course, be controlled by the position of the member 18 so that the time it will take the liquid to flow from chamber 7 into chamber 8 may be varied at will. Chamber 8 is, of course, provided with a vent as indicated at 21.

Referring now to Fig. 2, I have shown the wiring diagram by means of which this timing device can be connected to a motor 23 for example which motor may be used to operate a fuel feeding device for example to a hot water boiler. The circuit controlling device 24 may be as an example a boiler controlled switch adapted to open the circuit of the motor at any time the boiler reaches an excessive pressure. Such devices are old and well known on the market, and it is not believed to be necessary to show them for the purpose of this illustration. Mercury switch 11 is indicated in parallel with a thermostatic switch 25 such as may be found in ordinary heating installations for controlling the operation of the fuel feeding motor by the temperature of a room which is to be heated.

Now assuming that the boiler is at normal temperature and switch 24 therefor closed and the thermostatic switch 25 is closed, motor 23 will be connected to a source of current and therefore will operate to perform its fuel feeding function. Also coil 5 in series with the motor will at this time be receiving current, and, since it is in series with the motor, the initial current received by it will be very high enabling it to lift the plunger 6 and with it the piston 14 the cup lever 26 of which will contract and allow air to get underneath the piston during its upward movement.

Now when the coil 5 is energized, it immediately raises the plunger 6 causing the disk 18 to strike the lever 19 and open valve 9. The liquid in the upper chamber 7 flows by gravity into the lower chamber 8 causing float 10 to become lowered and thus tip the mercury switch 11 clockwise about the pivot point 27 until circuit is broken between the contacts 12 and 13. If by this time the thermostatic switch 25 has opened, which very likely would not be the case because of the fact that the time interval for the liquid passing from chamber 7 to chamber 8 may usually be made small, the motor would of course be stopped. If, however, the switch 25 remains closed, the motor will remain energized until such time as the switch 25 is opened. When this occurs, the motor 23 is deenergized and the period of deenergization of the motor begins because coil 5 is also deenergized at this time thus releasing the plunger 6 the weight of which forces the piston 14 downwardly to in turn force the liquid upwardly through the conduit 15 past the control valve 16 and into the chamber 7. Valve 9 is, of course, sufficiently heavy with its associated lever and rod to retain its seat against this pressure. Plunger 6 continues to force the liquid along the path just described until it finally raises the float 10 high enough to again close the contact between the members 12 and 13. This period is, of course, as is obvious, wholly under the control of the adjusting member 16 and does not vary at all with the current that may be supplied to the coil 5.

Having established connection at 12 and 13, the motor 23 is energized and at the same time coil 5 is energized to again initiate for a short interval the operation of the motor 23. Plunger 6 is raised by the coil 5 and again trips valve 9 to start the timing device in operation to determine the length of time the motor will run which, of course, depends upon the amount of time it takes for the liquid to run past valve 9 sufficiently to turn the mercury switch so as to break contact between 12 and 13.

At the termination of this period the original operation will be again undertaken—namely, that of forcing the liquid from chamber 8 into chamber 7 by way of the conduit 15 under the pressure of the plunger 6. In this way the motor 23 may be alternately turned on and off at any desired intervals which intervals are totally free from any influence due to variations in currents through the exciting coil 5 except in case of a complete failure of current.

One use to which this device is particularly applicable has been found to be that of controlling the feeding of fuel to a furnace in order to keep the fire from going out. The motor 23 may be used to operate an automatic fuel feeder such as a coal stoker, and with this timing device it can be operated at intervals sufficient to keep the fire going irrespective of whether or not the thermostat which operates the temperature control operates to close the motor 6, yet the device as shown in the previous description has no effect whatever upon the operation of the heating system under control of the thermostat as it starts its timing always at the time when the thermostat opens the circuit due to the proper temperature having been reached.

It is obvious that this is only one of the uses to which this device may be put, and the invention is not to be so limited.

Having thus described my invention, what I claim as new and desire to secure by Letters Patent is:

1. A timing device for alternately opening and closing a point in an electrical circuit comprising a solenoid coil connected in the circuit so as to be energized when the circuit is closed, upper and lower liquid containing chambers, a float in the upper chamber, a switch for controlling said circuit actuated by said float, separate passages for transferring the liquid from one chamber to the other and back again, means operated by energizing said coil to open one passage thereby removing fluid from the upper to the lower chamber, and lowering said float to actuate the switch, and means operative upon deenergization of said coil to force fluid through the other of said passages into said upper chamber to thereby raise the float and return the switch to its original position.

2. A timing device having a solenoid provided with means for connecting it in an electric circuit, a switch in said circuit, and means for alternately energizing said coil and opening said switch comprising a core for said solenoid, a lower liquid chamber having a piston therein connected with said core so as to tend to force liquid from said chamber when said core is released, an upper liquid chamber, a float in said upper chamber connected with said switch to open and close the same as the liquid falls and rises therein, a pair of passages connecting the lower and upper chambers, one of which conducts liquid only from the lower to the upper chamber, and valve means controlling the other conduit, said valve means being actuated by said core so as to open when the solenoid is energized and attracts the core.

3. A timing device for alternately opening and closing a point in an electrical circuit comprising a solenoid coil connected in the circuit so as to be energized when the circuit is closed, upper and lower liquid containing chambers, a float in the upper chamber, a switch for controlling said circuit actuated by said float, separate passages for transferring the liquid from one chamber to the other and back again, means operated by energizing said coil to open one passage thereby removing fluid from the upper to the lower chamber, and lowering said float to actuate the switch, and means operative upon deenergization of said coil to force fluid through the other of said passages into said upper chamber to thereby raise the float and return the switch to its original position, said last named means including a weighted piston in said lower chamber.

4. A timing device for alternately opening and closing a point in an electrical circuit comprising a solenoid coil connected in the circuit so as to be energized when the circuit is closed, upper and lower liquid containing chambers, a float in the upper chamber, a switch for controlling said circuit actuated by said float, separate passages for transferring the liquid from one chamber to the other and back again, means operated by energizing said coil to open one passage thereby removing fluid from the upper to the lower chamber, and lowering said float to actuate the switch, and means operative upon deenergization of said coil to force fluid through the other of said passages into said upper chamber to thereby raise the float and return the switch to its original position, said last named means comprising a piston in said lower chamber, and a weighted core for said solenoid connected with said piston.

5. A timing device for alternately opening and closing a point in an electrical circuit comprising a solenoid coil connected in the circuit so as to be energized when the circuit is closed, upper and lower liquid containing chambers, a float in the upper chamber, a switch for controlling said circuit actuated by said float, separate passages for transferring the liquid from one chamber to the other and back again, means operated by energizing said coil to open one passage thereby removing fluid from the upper to the lower chamber, and lowering said float to actuate the switch, and means operative upon deenergization of said coil to force fluid through the other of said passages into said upper chamber to thereby raise the float and return the switch to its original position, said last named means comprising a piston, a rod projecting upwardly from said piston, and a core for said solenoid on said rod, the weight of said core, rod, and piston serving to force the liquid from the lower chamber to the upper chamber.

6. A timing device having a solenoid provided with means for connecting it in an electric circuit, a switch in said circuit, and means for alternately energizing said coil and opening said switch comprising a core for said solenoid, a lower liquid chamber having a piston therein connected with said core so as to tend to force liquid from said chamber when said core is released, an upper liquid chamber, a float in said upper chamber connected with said switch to open and close the same as the liquid falls and rises therein, a pair of passages connecting the lower and upper chambers, one of which conducts liquid only from the lower to the upper chamber, and valve means controlling the other passage, said valve means being actuated by said core so as to open when the solenoid is energized and attracts the core, the degree of opening of said valve being controlled by an adjustable element carried by said core.

7. A timing device having a solenoid provided with means for connecting it in an electric circuit, a switch in said circuit, and means for alternately energizing said coil and opening said switch comprising a core for said solenoid, a lower liquid chamber having a piston therein connected with said core so as to tend to force liquid from said chamber when said core is released, an upper liquid chamber, a float in said upper chamber connected with said switch to open and close the same as the liquid falls and rises therein, a pair of passages connecting the lower and upper chambers, one of which conducts liquid only from the lower to the upper chamber, and valve means controlling the other passage, said valve means being actuated by said core so as to open when the solenoid is energized and attracts the core, said one passage conducting fluid from the lower to the upper chamber having means for varying the rate of flow therethrough whereby to control the time said switch remains open.

In witness whereof, I hereunto subscribe my name this 3rd day of April, A. D. 1930.

JAMES K. SHELLEDY.